US008660242B2

(12) United States Patent
Diroo et al.

(10) Patent No.: US 8,660,242 B2
(45) Date of Patent: *Feb. 25, 2014

(54) SYSTEM AND METHOD FOR ELECTRONIC MESSAGE NOTIFICATION

(71) Applicant: AT&T Intellectual Property I, L.P., Atlanta, GA (US)

(72) Inventors: Yolius Diroo, San Antonio, TX (US); Edward Walter, Boerne, TX (US); Paul R. McLaughlin, Round Rock, TX (US); Russell W. White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,339

(22) Filed: Oct. 23, 2012

(65) Prior Publication Data

US 2013/0070909 A1 Mar. 21, 2013

Related U.S. Application Data

(63) Continuation of application No. 11/115,982, filed on Apr. 27, 2005, now Pat. No. 8,320,528, which is a continuation of application No. 10/867,279, filed on Jun. 14, 2004, now abandoned.

(51) Int. Cl.
 *H04M 11/04* (2006.01)
(52) U.S. Cl.
 USPC ... 379/45; 379/93.01; 379/93.24; 379/265.09
(58) Field of Classification Search
 USPC .............. 379/37–51, 93.01, 93.24, 100.08, 379/265.09
 See application file for complete search history.

(56) References Cited

U.S. PATENT DOCUMENTS

| | | | |
|---|---|---|---|
| 5,805,587 | A | 9/1998 | Norris et al. |
| 5,880,732 | A | 3/1999 | Tryding |
| 6,212,408 | B1 | 4/2001 | Son et al. |
| 6,307,930 | B1 | 10/2001 | Mayer |
| 6,442,245 | B1 | 8/2002 | Castagna et al. |
| 6,804,334 | B1 | 10/2004 | Beasley et al. |
| 6,842,448 | B1 | 1/2005 | Norris et al. |
| 6,914,971 | B1 | 7/2005 | Bruening |
| 7,466,802 | B2 | 12/2008 | Lew et al. |
| 2002/0069220 | A1 | 6/2002 | Tran |

(Continued)

FOREIGN PATENT DOCUMENTS

| | | |
|---|---|---|
| WO | WO 0046973 A2 | 8/2000 |
| WO | WO0046973 A3 | 8/2000 |
| WO | WO2004032477 A1 | 4/2004 |
| WO | 2005125029 A2 | 12/2005 |

OTHER PUBLICATIONS

Sekiguchi T. et al.; "A Display Centric Ubiquitous Information System—Dokodemo Display"; IEEE; Jan. 26-30, 2004; Figure 1 and Section 2.1.

(Continued)

*Primary Examiner* — Duc Nguyen
*Assistant Examiner* — Yosef K Laekemariam
(74) *Attorney, Agent, or Firm* — Toler Law Group, PC

(57) ABSTRACT

A system includes an interface to receive a signal associated with a call from a first communication device to a second communication device. The system also includes a call suspension mechanism to suspend the call. The system further includes a call disposition engine to send an electronic mail message associated with the suspended call to a device identified by a subscriber address.

12 Claims, 7 Drawing Sheets

(56) References Cited

U.S. PATENT DOCUMENTS

| | | |
|---|---|---|
| 2002/0126679 A1 | 9/2002 | Morton |
| 2002/0168055 A1 | 11/2002 | Crockett et al. |
| 2003/0003900 A1 | 1/2003 | Goss et al. |
| 2003/0041326 A1 | 2/2003 | Novak et al. |
| 2003/0058858 A1 | 3/2003 | Berlyoung et al. |
| 2003/0074404 A1 | 4/2003 | Parker et al. |
| 2003/0099333 A1 | 5/2003 | Castagna et al. |
| 2003/0115610 A1 | 6/2003 | Cho |
| 2003/0142641 A1 | 7/2003 | Sumner et al. |
| 2003/0226149 A1 | 12/2003 | Chun et al. |
| 2003/0228011 A1 | 12/2003 | Gibson |
| 2004/0014474 A1 | 1/2004 | Kanada |
| 2004/0075675 A1 | 4/2004 | Raivisto et al. |
| 2004/0109551 A1 | 6/2004 | Simpson et al. |
| 2004/0111476 A1 | 6/2004 | Trossen et al. |
| 2004/0114541 A1 | 6/2004 | Caspi et al. |
| 2004/0215694 A1 | 10/2004 | Podolsky |
| 2004/0219906 A1 | 11/2004 | Benco et al. |
| 2005/0074109 A1 | 4/2005 | Hanson et al. |
| 2005/0123118 A1 | 6/2005 | Terry et al. |
| 2005/0277406 A1 | 12/2005 | Diroo et al. |
| 2005/0277408 A1 | 12/2005 | Stuckman et al. |
| 2006/0007899 A1 | 1/2006 | White |

OTHER PUBLICATIONS

Non-Final Office Action for U.S. Appl. No. 11/115,982 received from the United States Patent and Trademark Office (USPTO) mailed Jan. 23, 2009, 18 pages.

Final Office Action for U.S. Appl. No. 11/115,982 received from the United States Patent and Trademark Office (USPTO) mailed Jul. 15, 2009, 16 pages.

Non-Final Office Action for U.S. Appl. No. 11/115,982 received from the United States Patent and Trademark Office (USPTO) mailed Dec. 29, 2009, 24 pages.

Non-Final Office Action for U.S. Appl. No. 11/115,982 received from the United States Patent and Trademark Office (USPTO) mailed Jun. 25, 2010, 16 pages.

Final Office Action for U.S. Appl. No. 11/115,982 received from the United States Patent and Trademark Office (USPTO) mailed Dec. 10, 2010, 18 pages.

Non-Final Office Action for U.S. Appl. No. 11/115,982 received from the United States Patent and Trademark Office (USPTO) mailed Oct. 4, 2011, 18 pages.

Notice of Allowance for U.S. Appl. No. 11/115,982 received from the United States Patent and Trademark Office (USPTO) mailed Apr. 12, 2012, 17 pages.

Notice of Allowance for U.S. Appl. No. 11/115,982 received from the United States Patent and Trademark Office (USPTO) mailed Aug. 2, 2012, 10 pages.

Non-Final Office Action for U.S. Appl. No. 10/867,279 received from the United States Patent and Trademark Office (USPTO) mailed Apr. 19, 2007, 20 pages.

Non-Final Office Action for U.S. Appl. No. 10/867,279 received from the United States Patent and Trademark Office (USPTO) mailed Oct. 4, 2007, 18 pages.

Final Office Action for U.S. Appl. No. 10/867,279 received from the United States Patent and Trademark Office (USPTO) mailed Mar. 19, 2008, 17 pages.

Non-Final Office Action for U.S. Appl. No. 10/867,279 received from the United States Patent and Trademark Office (USPTO) mailed Oct. 1, 2008, 26 pages.

Final Office Action for U.S. Appl. No. 10/867,279 received from the United States Patent and Trademark Office (USPTO) mailed Apr. 15, 2009, 24 pages.

International Search Report and Written Opinion of the International Searching Authority for PCT/US05/18216, mailed Jul. 9, 2008.

SYSTEM AND METHOD FOR ELECTRONIC MESSAGE NOTIFICATION

CROSS-REFERENCE TO RELATED APPLICATIONS

The present application is a continuation of and claims priority to U.S. patent application Ser. No. 11/115,982, filed Apr. 27, 2005, issued as U.S. Pat. No. 8,320,528, and entitled "SYSTEM AND METHOD FOR ELECTRONIC MESSAGE NOTIFICATION," which is a continuation-in-part of and claims priority to U.S. patent application Ser. No. 10/867,279, filed Jun. 14, 2004 and entitled "E-MAIL IDENTIFICATION AND NOTIFICATION SYSTEM (EIANS)," both of which are incorporated by reference in their entirety.

FIELD OF THE DISCLOSURE

The present disclosure relates generally to communication services, and more specifically to a system and method for electronic message notification.

BACKGROUND

Telecommunication companies often provide to their customers information about incoming calls. One common service is caller identification (Caller ID). Standard Caller ID services generally provide a customer with an indication of who is calling without requiring the customer to answer the call. In operation, the systems supporting Caller ID may retrieve information about the calling party from a database and provide that information to the called party.

Often, this information is provided to assist in deciding whether or not to answer a given call. While Standard Caller ID has proven to be popular, an enhanced level of call awareness and information presentation may appeal to many customers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Figure 1:
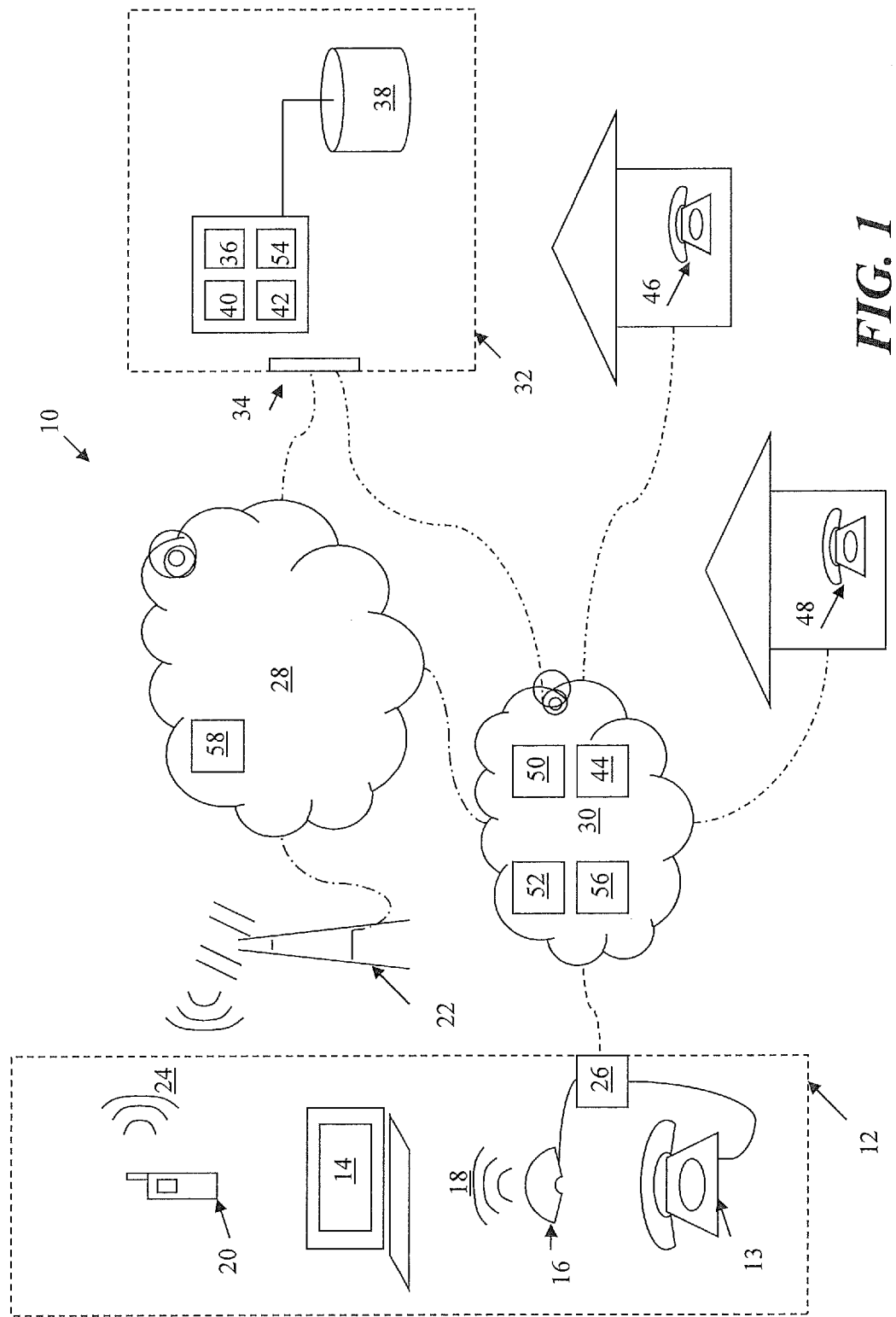
FIG. 1 presents a block diagram of an enhanced call activity notification system that incorporates teachings of the present disclosure.

Enhanced call awareness may take many forms. For example, a remote user may need to be made aware of call activity for a given telephone number. Perhaps a user wants to "see" Caller ID information while the user is on-line or connected to the Public Internet. A relatively simple service presenting Caller ID information to a user across a dial-up Internet connection (Internet Caller ID) may appeal to users. Such a service may make use of Advanced Intelligent Network (AIN) functionality or other similar signaling functions used, for instance, in the setup and control of telephone calls placed over a communications network.

If a telephone call is directed to a home telephone, a switch may recognize that the telephone line is busy and an AIN query may be launched to determine if the called party is using the telephone line to connect to a communication network such as the Internet. If the called party is on-line, a pop-up message may be sent via the on-line connection. In one embodiment, an Internet Service Provider (ISP) may pass Caller ID information to a subscriber of the Internet Caller ID service, and the subscriber may be presented with a limited number of call disposition options. The subscriber may, for example, request that a certain message be played to the calling party, may route the call to voice mail, and/or elect to end the on-line session and take the call.

The above-described service may be applied, for example, in circumstance where the subscriber enjoys one telephone line and a dial-up connection. Users availing themselves of additional communication assets and broadband connections may find more enhanced services to be attractive. For example, some subscribers may want to be informed when a 911 call has been placed from a telephone station associated with a given telephone number. Perhaps a subscriber has an elderly relative living at the subscriber's home. If the relative needs help when the subscriber is at work, the relative may dial 911. In some embodiments, such an event may be reported to the subscriber.

Other subscribers may want the ability to route an incoming call to destinations other than or in addition to voicemail. For example, a subscriber may want a call routed to a new location. The new location may be associated with a wireline telephone, a computer, a cellular telephone, a Voice-over Internet Protocol (VoIP) telephone, and/or some other device capable of performing communication functions. A telephone number or address, associated with the new location, may be pre-programmed into an element of the enhanced call information service. In some embodiments, the user may update this pre-programmed addressing information.

As mentioned above, a subscriber may want to route an incoming call to voicemail or unified messaging service. In some embodiments, the subscriber may want to receive a text-based and/or audio-based version of the message. For example, a calling party may leave a message, and the enhanced call information service may attach a text file, a .wav file, and/or some other file to an electronic message. The electronic message with attachments may then be sent to the subscriber. As such, the subscriber may have the ability to direct a call to voicemail and be in a position to know the contents of the voicemail message without actively checking the voice mailbox, which may involve pausing to call the voicemail service, entering appropriate mailbox and password information, and listening to a recorded message. In one embodiment, the above-described service options, as well as the other potential service options, may be implemented as session-initiated protocol applications (SIPS).

SIP offers a text-based description protocol that allows two systems to describe a media stream, which may be for example voice traffic, that needs to get from point A to point B. The description itself may include information relating to authentication, caller ID, media stream parameters, and/or other information for supporting a call between the two endpoints.

In operation, a call intended for a dialed number may be received in network on a channel. A call receipt process may begin in order to learn what to do and where to "send" the received call. For example, a dialed number, or some other type of device address may be translated into a variable for use during call processing activities. The processing activities may include, for example, a number of match tests performed against the variable. These match tests may be executed until a match is found.

A found match may have several allocated operators. These operations may have a priority indicator or number telling a processing server in what order the server should attempt to execute the applications associated with the found match. If, for example, there are three operations associated with a given match, a SIP-based system may prioritize the operations by giving them respective priority values of 1, 2, and 3—telling the processing server to try the priority 1 operation first.

In one embodiment, if an inbound call is directed to a dialed number, 345-6789, a variable value of 6789 may be assigned to the dialed number. The variable may then be compared against a list of match statements to determine how to handle the call. If the priority 1 application for the match is "Dial," this application may be performed.

The Dial application may direct the processing server to ring a remote channel and then connect the two channels together if the call is answered. The Dial application may also have additional capabilities. As mentioned above, if a Dial application gets an answer on the remote channel, the two callers may be bridged together and the call may proceed. After the call, one or both parties to the call may elect to hang up. When this occurs, the Dial routine may exit with a non-zero status, and the priority list may stop executing because the call is terminated.

In some cases, there may be no answer to the call launched by the Dial application. If, for example, the Dial application rings a remote phone for some set amount of time, which may be specified in a Dial statement, and there is no answer, Dial may exit and the next priority application may be executed. In many cases, the next application may be a voicemail application, and the caller may hear an "unavailable" greeting for the called party.

If the Dial application gets a "busy" answer back from the remote phone, or the remote phone is not on-line, the Dial application may apply an adder value to the existing priority value—allowing the processing server to bypass the level 2 priority and route directly to a level 3 or higher priority application. For example, the caller may be routed to a "busy" greeting for the called party.

A service provider may elect to provide SIP-like functionality using several different architectures. Depending upon implementation detail, some SIP components may be combination modules or discrete modules, implemented in software, hardware, and/or firmware. From a high level, many SIP system components may be acting as or executing user agents and/or SIP servers.

For example, telephony devices may include user agents (UAs), which may be a combination of a user agent client (UAC) and a user agent server (UAS). In operation, a UAC entity may be permitted to create an original request, and a UAS may represent one or more server types capable of receiving requests and sending back responses. A SIP UA may be implemented in hardware such as an IP phone or a gateway component or in software such as a softphone application running on a computing platform.

Various SIP UAs may connect to one another with the help of a collection of SIP servers. In many cases, these SIP servers may be executing on centralized hosts of a distributed communication network. Again depending upon implementation detail, a large SIP system may include several different kinds of servers such as Location Servers, Proxy Servers, Redirect Servers, and Registrar Servers.

In operation, a Location Server may be used by a Redirect server or a Proxy Server to obtain information about a called party's location. A Proxy Server may represent an intermediary program that acts as both a server and a client for the purpose of making requests on behalf of other clients. Such requests may be serviced internally or transferred to other servers. In some cases, a Proxy Server may interpret and then rewrite a request message before forwarding it. A Redirect Server may accept a SIP request, map the address into zero or more new addresses, and return these addresses to the client. In some cases, the Redirect Server may be designed such that it does not accept calls but does generate SIP responses that instruct a UAC to contact another SIP entity. As the name implies, a Registrar Server may accept REGISTER requests and may be co-located with a Proxy or Redirect server to offer these servers some level of location server-like assistance.

As referenced above, an AIN, SIP, and/or SIP-like system may facilitate providing enhanced call-awareness features in accordance with the teachings of the present disclosure. Many of these features, in addition to the above-described features are described in connection with the Figures. As mentioned above, FIG. 1 presents a block diagram of an enhanced call information system 10 that incorporates teachings of the present disclosure. As depicted, system 10 includes a remote physical location indicated at 12 that contains various computing devices accessible by a user or subscriber. The devices may include, for example, a wired telephone 13, a laptop computer 14, and a wireless telephone 20, each of which may be capable of acting as a SIP.

In the embodiment of FIG. 1, laptop 14 may a have short-range or local area wireless transceivers that serve to connect laptop 14 to LAN hub 16 across wireless link 18. Wireless phone 20 may be "connected" to a cellular network node 22 across a wireless link 24, which may be, for example, a General Packet Radio Service (GPRS) or some form of Enhanced Data GSM Environment (EDGE). Laptop 14 and wireless phone 20 may each include several electronic components and computing devices. These devices may also include a computer-readable medium having executable computer-readable data to store an address for an enhanced call information service node, to recognize that a data network connection exists, and to initiate sending a message to the service node address via the data network connection. The message may provide access or addressing information that indicates how to send data to laptop 14 and/or telephone 20. The computer-readable data may also have the ability to initiate presentation of a GUI element presenting received data on laptop 14 and/or telephone 20.

Wireless links 18 and 24 may be implemented in several ways. The link type may depend on the electronic components associated with the given wireless devices and wireless LAN hubs. The wireless computing device and/or wireless hub (Wireless Enabled Devices) may include any of several different components. For example, a Wireless Enabled Device may have a wireless wide area transceiver, which may be part of a multi-device platform for communicating data using radio frequency (RF) technology across a large geographic area. This platform may for example, be a GPRS, EDGE, or 3GSM platform, and may include multiple integrated circuit (IC) devices or a single IC device.

A Wireless Enabled Device may also have a wireless local area transceiver that communicates using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of twenty-five to one hundred feet. If the wireless local area transceiver includes an 802.11(x) transceiver, such as an 802.11(a)(b) or (g), the transceiver may have a communication range with an approximate radius of one hundred fifty to one thousand feet.

As shown in FIG. 1, LAN hub 16 may represent an 802.11 (x) embodiment, which may in some cases be referred to as a hotspot. LAN hub 16 may be communicatively coupled to a network bridge 26 capable of connecting hub 16 to a broader network, like Public Internet 28. As shown, both laptop 14 and wireless phone 20 may be ultimately coupled to Public Internet 28. Laptop 14 may connect via link 18 to hub 16 and via bridge 26 to a service provider network 30, which may facilitate connection to public Internet 28. In some embodiments, network 30 may be a cable network, and bridge 26 may include a cable modem. As depicted, network 30 may be a Public Switched Telephone Network (PSTN), and bridge 26 may include an xDSL modem.

In practice, the information communicated across the various links of system 10 may be compressed and/or encrypted prior to communication. Communication may be at least partially via a circuit-switched network like the PSTN, a frame-based network like Fibre Channel, or a packet-switched network that may communicate using Transmission Control Protocol/Internet Protocol ("TCP/IP") packets like Internet 28. The physical medium making up at least some portion of the various links may be coaxial cable, fiber, twisted pair, an air interface, other, or a combination thereof. In some embodiments, network access links may provide a broadband connection facilitated by an xDSL modem, a cable modem, an 802.11x device, some other broadband wireless linking device, or a combination thereof. The broadband connection may include a link providing data rates greater than 56 Kbps. Other broadband connections may provide data rates greater than 144 Kbps, 256 Kbps, 500 Kbps, 1.0 Mbps, 1.4 Mbps, or faster.

In a preferred embodiment of system 10, a user may seek to log into Internet 28 and data services associated therewith. The user may be operating laptop 14 and connect to wireless LAN hub 16 via link 18. The user may then use a browser like Netscape or Internet Explorer to request access to a web-based data service. In some embodiments, the initiation of a new or different network connection may be recognized and a message providing addressing information for laptop 14 may be sent to an enhanced call activity service node 32.

As depicted, service node 32 may be communicatively coupled to service provider network 30. In operation, service node 32 could act in a service bureau mode supporting and/or making itself available to other networks and other service providers. Node 32 may include a gateway 34 or interface that receives network-launched queries as well as addressing information from subscribers. Gateway 34 may communicate with a memory engine 36 that manages and maintains information stored in memory 38. The stored information may include then-current addressing information for laptop 14 and a notification rule for a subscriber using laptop 14. In some embodiments, memory engine 36 may also include an updated engine that allows subscribers to modify their stored addressing information.

During operation of an enhanced call activity service, a messaging engine 40 associated with node 32 may be capable of sending a message addressed to a data network address associated with a subscriber to the service. The message may be communicated across a network such as network 30 and/or Public Internet 28. The messaging engine may be responsive to a trigger signal that may be output by a notification engine 42. The message may include call activity information for a call and may be sent using one or more of several different messaging mechanisms. These mechanisms may include, for example, an electronic mail message, a browser pop-up, a mobile alert, an Instant Message (IM), a Short Messaging Service message (SMS), an Enhanced Messaging Service message (EMS), and/or a Multi-media Messaging Service message (MMS).

As depicted, notification engine 42 may be associated with node 32. Notification engine 42 could also be associated with a service provider network, like network 30. In operation, notification engine 42 may output a trigger signal without consideration for a busy status of a called telephone line. Unlike an Internet Caller ID service that may only send information when a called line is busy, system 10 may send call activity information even in situations where the called line is available. In some embodiments, decisions regarding when to send a call activity message may be made in accordance with a user-specific notification rule, which could include, for example, a send message in connection with all incoming calls setting, a send message in connection with all outgoing calls settings, a send message in connection with incoming calls from identified callers setting, a do not send message setting, a send message in connection with outgoing international calls, a send message in connection with outgoing calls placed to 900, 976 or other toll services and a send message in connection with outgoing 911 calls setting.

In some embodiments, a call activity message may also include a call disposition question. In operation, an interface 44 may receive a signal associated with a call from telephone 46 to a telephone number identifying telephone 48. A call information engine 50 may recognize that a party to the call subscribes to a call activity information service, and a call suspension mechanism 52 may hold the call for some period of time. A call disposition engine 54 may then initiate sending of a call disposition query to a stored data network address of the subscriber. The query may effectively ask the subscriber what the subscriber wants to do with the call. Disposition engine 54 may receive a call disposition command indicating a preferred call disposition, and a call completion engine 56 may route the call in accordance with the call disposition command. In the absence of a timely response, call completion engine 56 may route the call as dialed.

With reference to the above description of a call from telephone 46 to telephone 48, a disposition command may indicate a desire to route the call to telephone 48 as a Plain Old Telephony Service (POTS) call. Other disposition options may include, for example, forwarding the call to a network-based voice mailbox 58, routing the call as a packetized call addressed to laptop 14, and/or ringing through to a different telephone number, which may identify telephone 13 or telephone 20.

As depicted, interface 44, call information engine 50, call suspension mechanism 52, and call completion interface 56 may be included within a network element, such as a switch, a router, or an AIN node of network 30. These engines and mechanisms may also be included within other components and/or networks.

Figure 2:
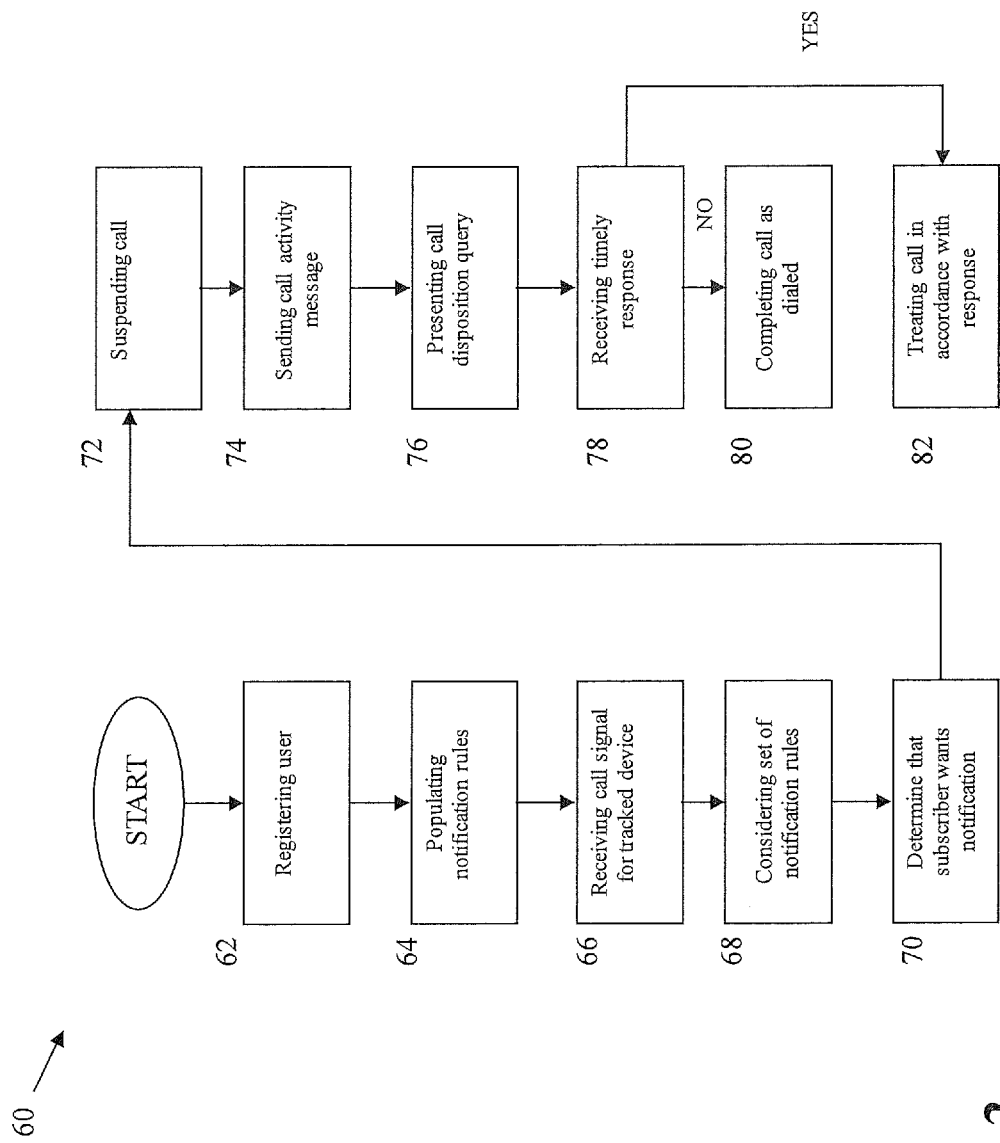
FIG. 2 shows a flow diagram for a technique that may be used to implement teachings of the present disclosure.

Operation of a system 10 may be better understood by reference to FIG. 2. As mentioned above, FIG. 2 shows a flow diagram for a technique 60 that may be used to implement teachings of the present disclosure. At step 62, a subscriber may be identified as someone who wants to receive call activity notifications indicating call activity at one or more tracked telephones and/or messaging devices. A memory may be populated with a subscriber identifier, which may be a ten-digit telephone number and/or an Internet Protocol or MAC address associated with a tracked device. The memory may also be populated with a messaging address to receive call activity notifications.

In some embodiments, the messaging address may include a telephone number, an Internet Protocol address, a data network connection rule, and/or some other address. The messaging address may also be updateable and represent a then-current mechanism for contacting the subscriber. At step 64, subscriber notification rules may be added. A subscriber may not want to receive a call activity message every time there is some call activity at an activity tracked subscriber telephone or messaging device.

At step 66, a signal may be received indicating a desire to complete a call or send a message to a tracked telephone or device associated with the subscriber. The signal may indicate for example a calling party and/or a called party telephone number, and one of these numbers may be the subscriber identifier referenced above in connection with step 62. If, for example, the called party telephone number is the home telephone number of the subscriber, a system like system 10 of FIG. 1 may recognize that the call involves the subscriber.

Details of the call may be compared against the notification rules at step 68, and a determination may be made at step 70 to notify the subscriber. The call may be suspended at step 72, and a call activity message may be generated and communicated to the then-current messaging address at step 74. The then-current messaging address may be the original address referenced above in connection with step 62 or an updated address. The messaging address may be associated with a network-connected computer and/or telephone. The messaging address may also be associated with a wireline connected telephone number. For example, a subscriber may want to receive call activity notification via a voice call to an office phone, a wireless phone, a VoIP phone, a hotel phone, and/or some other phone located in a physical location away from the dialed telephone.

In some embodiments, a call activity message may contain a call disposition query. This query may be presented to the subscriber at step 76, and the subscriber may respond with a call disposition request at step 78. In some cases, the subscriber may not respond to the query, and the call may be completed as dialed at step 80. In other cases, the subscriber may respond, and the call may be treated as requested at step 82.

Figure 3:
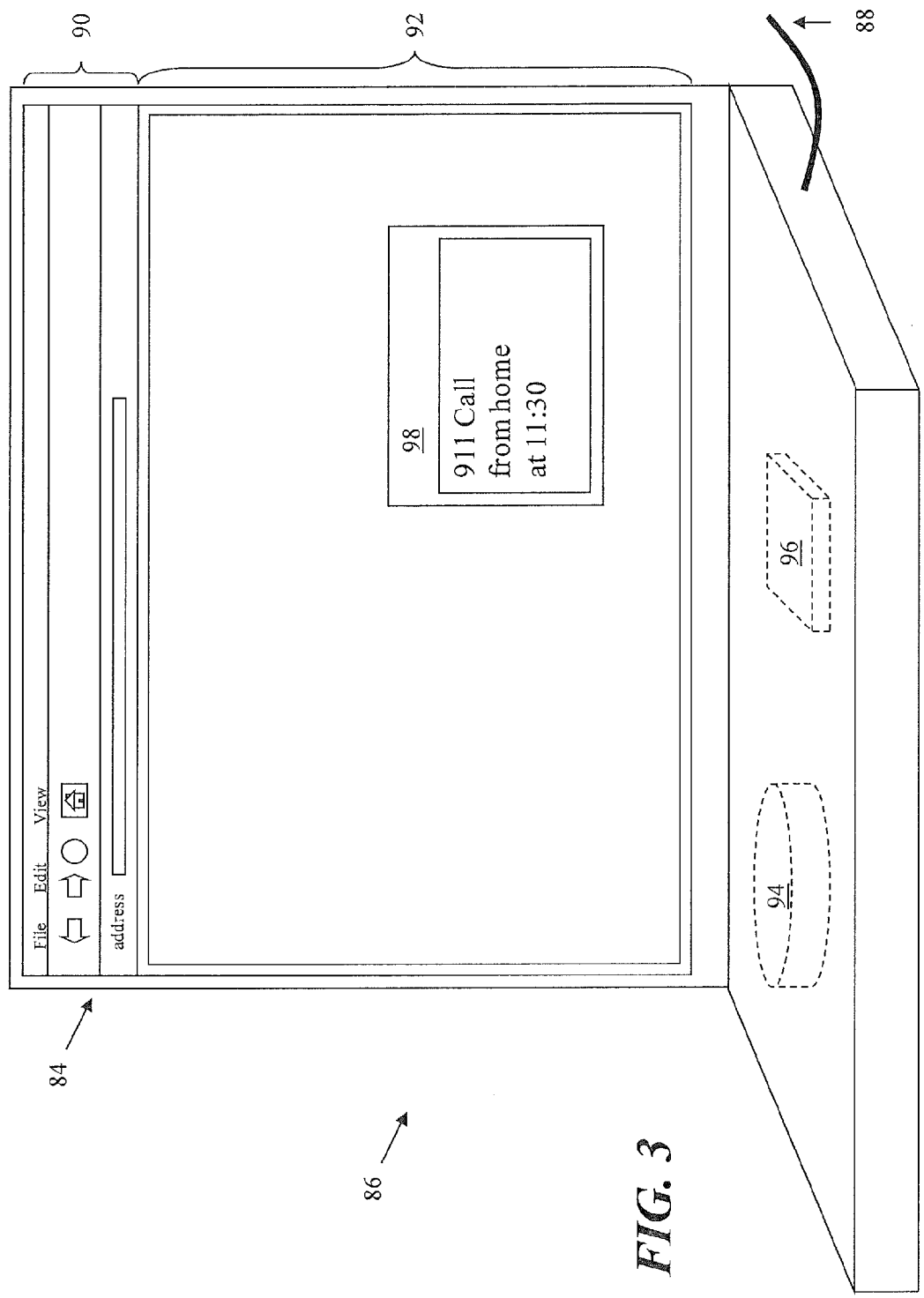
FIG. 3 presents a simplified block diagram for a system that incorporates teachings of the present disclosure to present an enhanced level of call activity awareness.

As mentioned above, FIG. 3 presents a simplified block diagram for a system 84 that incorporates teachings of the present disclosure to present an enhanced level of call activity awareness. System 84 includes a laptop computer 86, which may be communicatively linked via link 88 to a data network like the Public Internet. A web browser application may be running on laptop 84 and may present a user of the laptop with a navigation window 90 and a document pane 92. In operation, a user may type a Uniform Resource Locator (URL) into a portion of navigation window 90 and a page having that URL may be communicated to laptop 84 and presented within document pane 92. When the laptop sends a request for the page having the input URL, a network element of the data network may recognize in the request an address to which it should send the page.

The presence of a network connection at least partially provided via link 88 may be recognized by a component of laptop 86. For example, laptop 86 may include a computer-readable medium 94 storing computer-readable data. Execution of some part of this data by a processor like processor 96 may allow laptop 86 to store an address for an enhanced call information service node, to recognize that a data network connection exists, and to initiate sending a message to the address via the data network connection. In some embodiments, the message may provide access information that indicates how to send call activity information to laptop 86. Laptop 86 may also initiate presentation of GUI element 98 that may, as depicted, present call information to the user within the boundaries of document pane 92.

Figure 4:
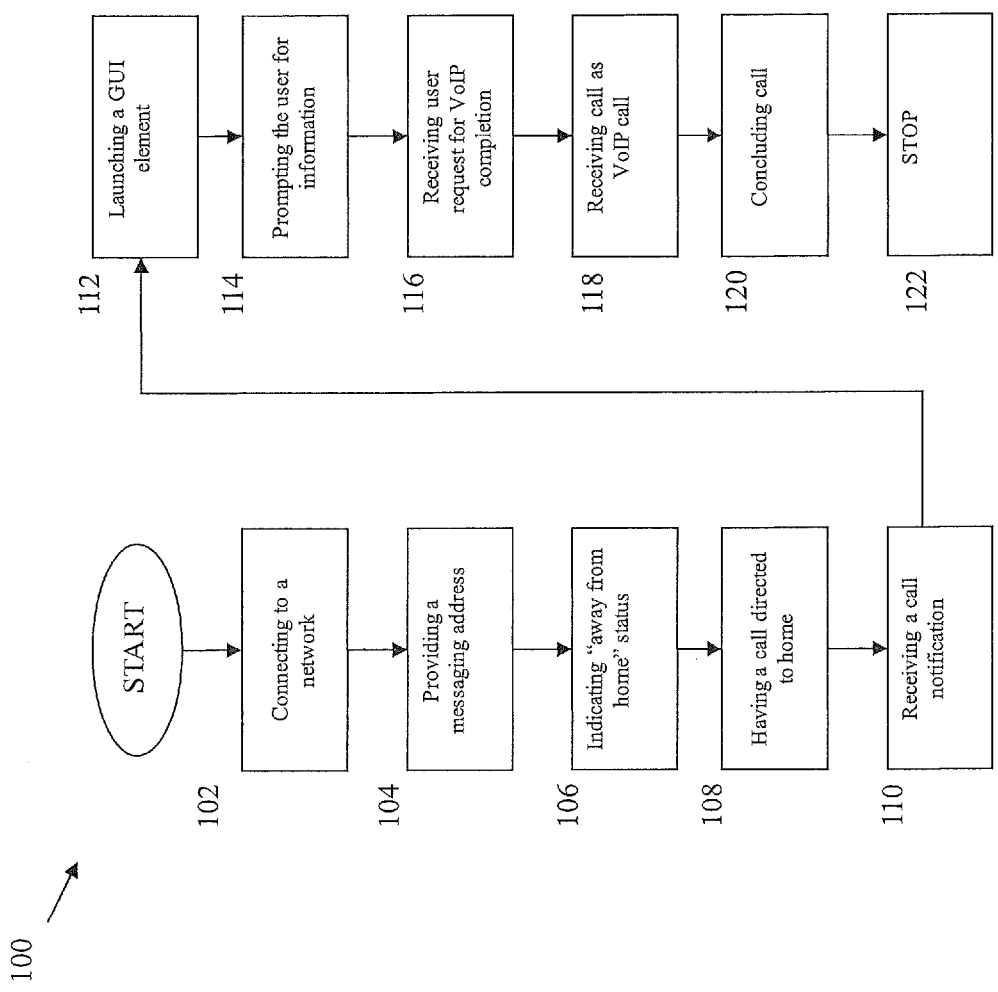
FIG. 4 shows a flow diagram for a technique that may be used to implement teachings of the present disclosure.

FIG. 4 shows a flow diagram for a technique 100 that may be used to implement teachings of the present disclosure. At step 102, a user may connect to a network with a computing device. The network may be a SIP-enabled network capable of communicating packetized data such as Internet Protocol (IP) data packets. At step 104, a messaging address for the user may be sent to a call activity service node reachable via the network, and an "away from home" status indicator may be sent to the node at step 106. The "away from home" status may alert the node that the user wants to be notified of call activity associated with a home telephone or computing device.

At step 108, a call may be directed to the home telephone or computing device, and the user may receive a notification of that activity at step 110. At step 112, a GUI element may be launched and presented on the network-connected computing device. The GUI element may present information about the call activity and may prompt the user to input guidance on how to treat the call at step 114. At step 116, the user may request that the call be routed to the network-connected computing device and completed as a VoIP call.

At step 118, the user may receive and engage in a VoIP telephone call. The calling party may or may not be notified or made aware of the fact that the call placed to a dialed telephone number was completed to a different location and a different device. At step 120, the call may be concluded, and technique may progress to stop at step 122.

Figure 5:
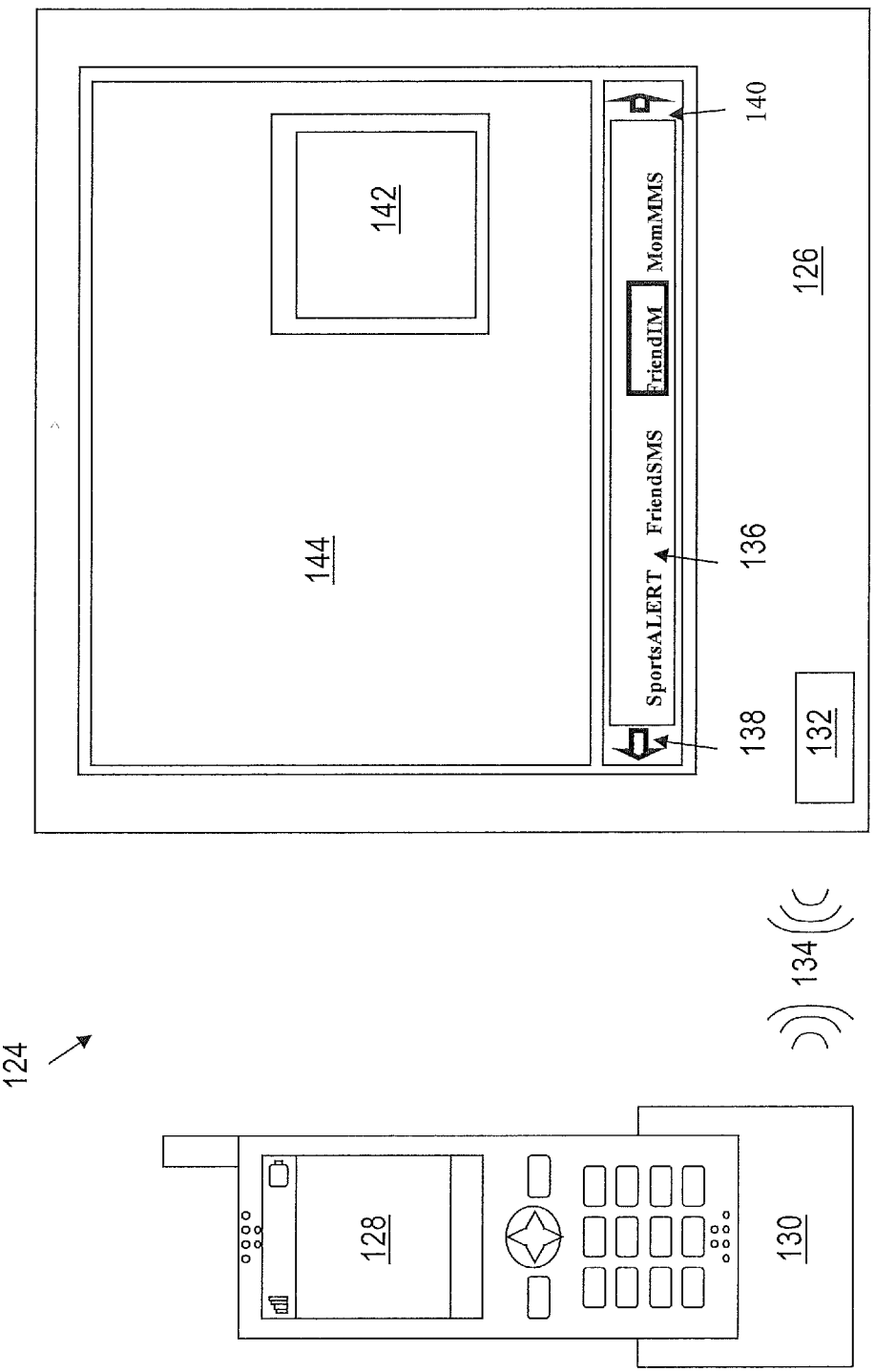
FIG. 5 depicts a communication system that may be used to implement teachings of the present disclosure to present messages on an alternate device.

As mentioned above in the brief description of the drawings, FIG. 5 depicts a communication system 124 that may be used to implement teachings of the present disclosure to present messages on an alternate device. As depicted, system 124 includes a television 126 and a cellular telephone 128. Cellular telephone 128 may have been docked in device 130. Device 130 may include a wireless beacon and may, in some embodiments, be operable as a wireless local area network hub. As such, device 130 may be in communication with a wired network element such as a cable modem or xDSL modem.

Associated with television 126 is wireless receiver 132. Receiver 132 may be operable to communicate with device 130 using a Radio Frequency (RF) technology. Receiver 132 may couple to television 126 by plugging into a video input jack, a Universal Serial Bus (USB) port, and/or some other interconnection technique. In operation, device 130 may communicate with receiver 132 via a wireless signal 134. As depicted, wireless data messages and message notifications received by telephone 128 have been communicated across wireless link 134 and are being presented as selectable icons in scrolling display 136.

A user of system 124 may interact with television 126 and scroll forward using icon 138 or backward using icon 140 through the received messages and/or notifications. As depicted, the user has selected "FriendIM" and an IM session element 142 has popped-up on display 144. As such, a user may be able to watch a television show on display 144 of television 126 while also keeping track of wireless data being sent to telephone 128. Moreover, a user may make use of existing electronic devices to interact with a wireless messaging service. As such, the user may be able to conserve telephone 128's battery life and view messages on a display having a picture quality and screen size much better than that of telephone 128.

In operation of systems like system 10, incorporating teachings of the present disclosure, nodes, servers, modules, mechanisms, and/or engines may be implemented in several ways. For example, they may include hardware, firmware, software, executable code, and/or a combination thereof. Platforms, which may be implementing nodes, servers, modules, mechanisms, and/or engines, may be made up of a microprocessor, a personal computer, a computer, some other computing device, or a collection thereof. Though nodes, servers, modules, mechanisms, and/or engines may have been described as individual elements, one or more may be combined and designed to operate as a single element.

The various embodiments of the present invention involve the placing of telephone calls. These calls may comprise voice communications transmitted, either alone or in combination with data, video, or other messaging via either a public switched telephone network, a public or private wireless communication network, a private telephone network, via digital subscriber line access to a computer or telephony network, cable-television-based access to a computer or telephony network, satellite-based access to a computer or telephony network, or any combination thereof.

Based upon the herein-disclosed high-level description, one or more computer programs to direct one or more computers to perform the method is within the skill of a routineer in the art of telecommunications.

Embodiments of the herein-disclosed method may be directed by computer-readable instructions encoded on a computer-readable medium. The contents of the computer-readable medium cause at least one computer to perform the herein-disclosed acts. For this purpose, at least one computer processor is responsive to the contents of the computer-readable medium. Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

In various embodiments, the wireless phone or wireless communication device may take various forms including personal digital assistants with built in communications circuitries, wireless telephones, cellular telephones, mobile telephones, and other wireless devices. Moreover, many of the devices, software, and/or pieces of equipment, referenced herein, may be SIP-enabled and may act, for example as a SIP UA.

Figure 6:
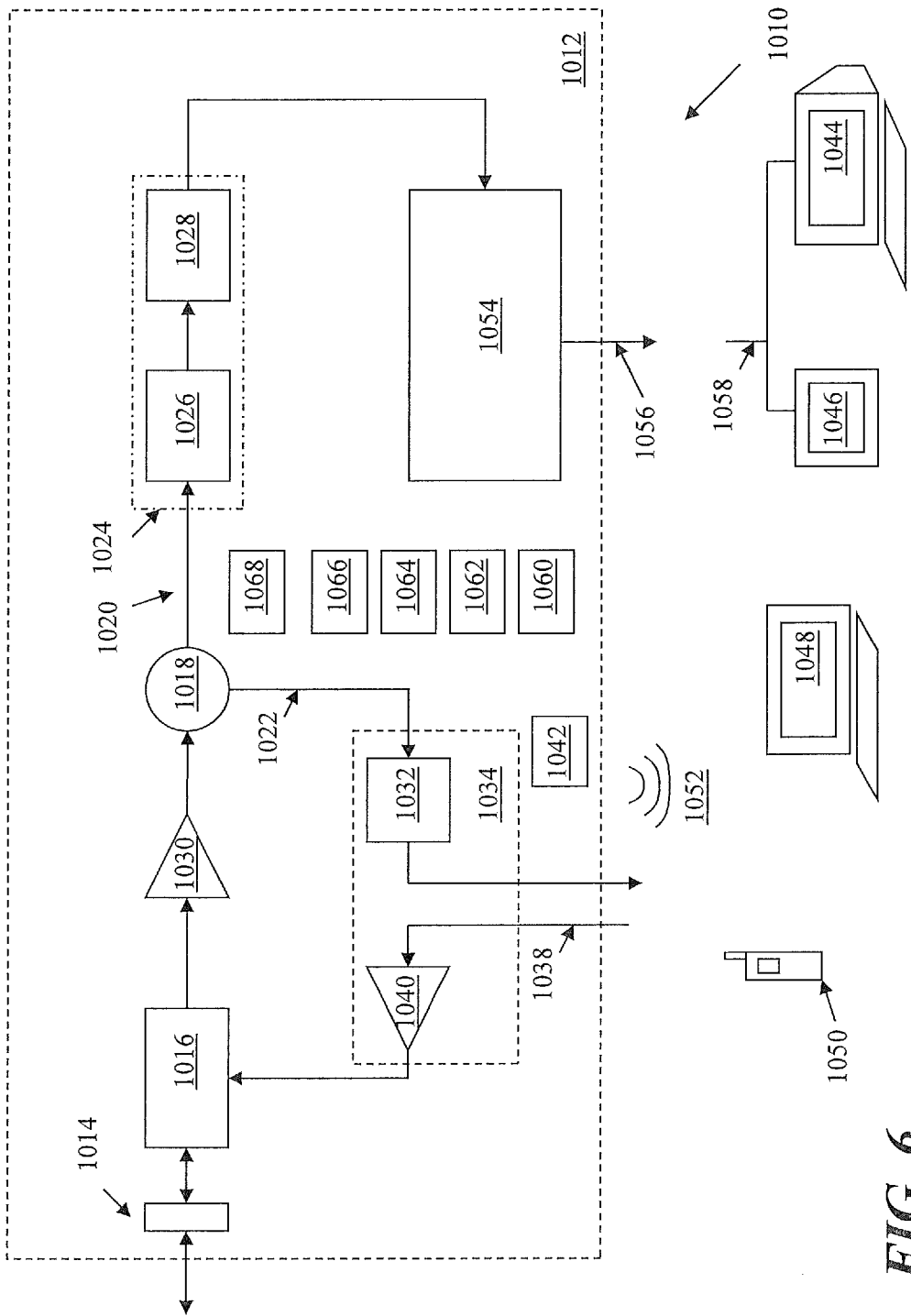
FIG. 6 presents a block diagram of a networked system that incorporates teachings of the present disclosure.

As mentioned above, FIG. 6 presents a block diagram of a system 1010 that incorporates teachings of the present disclosure. As depicted, system 1010 includes an integrated tuning system 1012, which may be a Set-Top Box (STB), a personal computer (PC) executing a video application, a wireless local area networking (WLAN) hub, or some other integrated electronic device. As depicted, system 1012 includes a network interface adapter 1014 providing at least a portion of a communication path interconnecting system 1012 to a wide area communication network, which may include a cable network, a direct broadcast satellite (DBS) system, a telecommunication network, and/or some other network capable of communicating information to system 1012.

In operation, adapter 1014 may receive a signal representing several different types of information including video information streams, telephony-related information, data transmissions, and/or other types of information. For example, a cable service provider may broadcast a signal to each of its customers that represents hundreds of video channels and several more broadcast audio channels. Satellite television providers, like DBS providers, may provide even more channels. A signal received by adapter 1014 may include these types of signals in combination with other less universally distributed signals.

In some embodiments of system 1012, adapter 1014 may perform front-end subsystem functions like signal reception, demodulation, error correction, signal encoding, and/or other signal manipulations. Many of these subsystem functions may be provider specific. For example, a signal coming from a cable head end may require front end processing that is substantially different than the processing performed on a DBS signal.

Adapter 1014 may output a processed signal to diplexer 1016. As depicted, system 1012 may be capable of performing several high-end functions. For example, in addition to performing some STB-like functions, system 1012 may also effectively function as a multimedia desktop computer that runs a variety of advanced services such as videoconferencing, home networking, Internet Protocol telephony, Video on Demand (VoD), high-speed Internet Television, personal video recording, and/or others. Diplexer 1016 may facilitate some of these services by distinguish between upstream and downstream communication flow. In some embodiments, different types of traffic may be carried in different frequency band. For example, data traffic may be carried in one band while voice telephony traffic may be carried in another. Similarly, upstream traffic may be carried in a defined frequency range that is different than the defined frequency range of downstream traffic. As such, diplexer 1016 may be able to separate traffic types by reference to the frequency of the signals.

Diplexer 1016 may output a downstream multiplexed signal to a splitter 1018, which may be passive in operation. In some embodiments, splitter 1018 may passively split a signal into an intermediate signal 1020 and a downstream data stream 1022. Signal 1020 may feed an output module 1024. As shown, output module 1024 may include a decoder 1026 and a modulator 1028. Because splitting a signal may degrade the noise figure (NF) of a system, a low noise, high linearity amplifier 1030 may be added to system 1012 upstream of splitter 1018. In some embodiments, amplifier 1030 may be low noise and high linearity so as not to compromise what is downstream in the signal chain.

As shown, splitter 1018 may also pass a data stream 1022 through tuner 1032 to a modem 1034, which may be integral to or separate from system 1012. Modem 1034 may be a cable modem supporting a DOCSIS standard, a dial-up modem, a wireless modem, a satellite modem, and/or an xDSL modem. In some embodiments, tuner 1032 may alter stream 1022 and output a signal in a form or modulation schema acceptable to modem 1034. On the upstream side, an outgoing signal 1038 may pass through amplifier 1040 and into diplexer 1016 for delivery to a broader network, like the Public Internet.

In some embodiments, system 1012 may include WLAN module 1042. Module 1042 may operate as a WLAN hub and my support communication via a 900 MHz communication signal similar to those employed by cordless telephones, an 802.11(x) communication protocol, a Bluetooth communication protocol, or some other WLAN communication technique. When operating as a WLAN hub, module 1042 may effectively allow system 1012 to act as a wireless home networking hub. As such, other electronic devices in the home, like desktop computer 1044, television 1046, laptop 1048, and wireless telephone 1050 may be able to enjoy Internet connectivity via system 1012 and wireless link 1052.

System 1012 may also include a premise network interface 1054, which may output signal 1056 with information streams representing, among other things, broadcast channel programs to premise network element 1058. In some embodiments, network interface 1054 may also support modem 1034 and/or allow for two-way communication across premise network element 1058. As depicted, system 1012 also includes a local memory 1060, which may store, among other things, a file having computer-readable instructions to direct a processor of a wireless telephone like telephone 50 to recognize the accessibility of a WLAN hub like module 1042. The file may have been received by system 1012 via adapter 1014 and may, in some embodiments, be wirelessly-communicated to telephone 1050.

The computer-readable instructions may also work with and recognize that a user is creating a wireless messaging service message configured for communication from wireless telephone 1050 to a wide area wireless network element like a cellular tower. The message may be for example, a Short Messaging Service (SMS) message, an Enhanced Messaging Service (EMS) message, and/or a Multi-media Messaging Service (MMS) message. Whatever the format, the computer-readable instructions may allow telephone 1050 to re-route the message to a WLAN hub, which may be module 1042. As such, the message may be sent via system 1012 as opposed to via a wide area wireless data service like General Packet Radio Service (GPRS). In effect, this may allow the user to save considerable money as some wireless messaging services are based on a relatively expensive cost per message billing plan.

Memory 1060 may also maintain a messaging address for one or more subscriber-related devices. These addresses may be programmed into memory 1060 and may, in some cases, be readily updateable. In an embodiment where system 1012 "knows" a messaging address for a subscriber, messaging engine 1062 may initiate communication of message containing call activity information to the messaging address. Call activity information may represent, for example, Caller ID information for an incoming call, and the message may be sent using several different services such as electronic mail, mobile alerts, Instant Messaging, Short Messaging Service, Enhanced Messaging Service, and/or Multi-media Messaging Service.

In some embodiments, system 1012 may also include enhanced presence awareness features. A presence detection engine 1064 may recognize when a subscriber is at home, at the office, or some other defined area near system 1012. The subscriber may want to send an SMS message from wireless telephone 1050. Wireless telephone 1050 may be an SMS enabled device. Telephone 1050 may also be an Enhanced Messaging Service (EMS) enabled device, a Multi-media Messaging Service (MMS) enabled device, and/or an Instant Messaging (IM) enabled device. As such, telephone 1050 may be embodied in a data-capable device, a cellular telephone, a smartphone, a PDA, or some other wireless-enabled communication device.

An SMS or Short Message Service offering may allow the transmission of short text messages to and from a mobile phone, fax machine, and/or IP address. SMS Messages may be approximately 160 alphanumeric characters and may contain little or no images or graphics. An MMS or Multi-media Messaging Service offering may involve a store-and-forward technique of transmitting graphics, video clips, sound files and short text messages over wireless networks using a protocol like Wireless Access Protocol (WAP). With SMS, EMS, MMS and other services, a carrier may deploy network-based assets to implement the offerings.

With an MMS offering, the presentation characteristics of a message may be coded into a presentation file so that the images, sounds, and/or text are displayed at the recipient device as intended by the sender. To a subscriber, SMS, EMS, and MMS may operate in a similar manner. To an operator, MMS may be slightly different and may use its own standardized presentation protocol, Synchronized Multimedia Integration Language (SMIL).

SMIL operates as a descriptive or markup language that performs functions similar to those performed by HTML on the Web. SMIL provides a set of rules for integrating multimedia elements of text, images, audio, and video sequences in a multimedia message so that they can be transported across a network. SMIL may also control the display and layout of an MMS presentation, helping to ensure that the presentation of the multimedia elements may be delivered and presented in accordance with the sender's intent.

The elements of a specific multimedia message may be combined in a so-called SMIL container before transmission. This container may be linked to or encapsulated in a WAP file, which may provide information like sender and recipient addresses. In operation, a WAP portal may "see" the MMS message as it routes to a messaging service center of an operator offering or supporting the messaging service.

In some implementations of system 1010, a user may elect to send an SMS message, an EMS message, an MMS message, an IM message, an electronic mail message, and/or other some message from telephone 1050. When the user is away from system 1012, these messages may be addressed to an intended recipient and communicated from telephone 1050 to a wide-area wireless network node like a cellular tower. When presence detection engine 1064 recognizes that the user is near system 1012, the messages may be communicated to module 1042 and routed to the intended recipient via system 1012.

As such, the user may be able to effectively send a wide area wireless data message from a location that may have limited or low quality cellular coverage. In an embodiment where system 1012 connects to a wired network like the PSTN or a cable network, the user may be able to effectively send a wide area wireless data message across a combined local area wireless network and wired network. However sent, a message may be delivered to its intended recipient and the intended recipient may be notified of the message.

With wirelessly connected recipients, the notification may be provided in a WAP format and may contain the "name" of the sender, information about the message content, and a Web address (URL) needed to call up and retrieve the message. The Web address may be associated with a communication service provider network element, a unified mailbox associated with an intranet, extranet and/or the Public Internet 1048, or some other network-connected resource. From the recipient perspective, a message may download in response to a retrieval command, which may be initiated in several ways. For example, a user may press a button on his or her telephone or interact with a graphical user interface (GUI) presented on a display associated with his or her computer.

With such advanced features, system 1012 may also include a Web interface engine 1066. Engine 1066 may allow remote web-based administration of system 1012. System 1012 may also include local administration features. As shown, graphical user interface (GUI) engine 1068 may be capable of initiating presentation of a GUI on a television display communicatively coupled to premise network 1058. The GUI may also be presented in connection with a Web browser and a Web browsing session of a user. Similarly, an administrator may be presented with an administration screen. The screen may also allow for simplified configuration of the features associated with system 1012. The administration screen may also allow a user to configure or administer a home network that includes system 1012.

Figure 7:
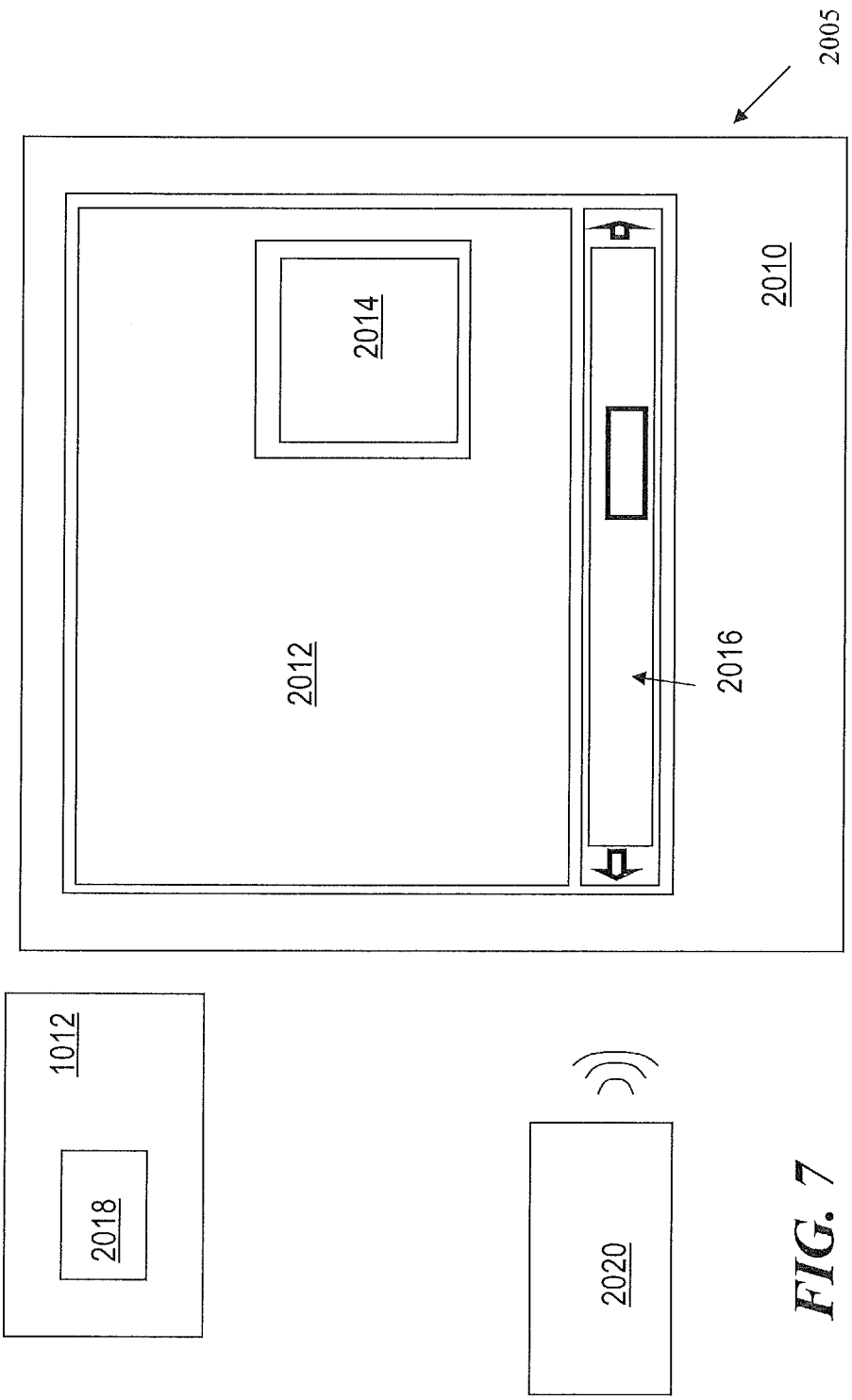
FIG. 7 presents a block diagram of a system that may be used to implement teachings of the present disclosure to present messages on a video display.

As noted above, FIG. 7 presents a block diagram of a system 2005 that may be used to implement teachings of the present disclosure to present messages on a video display. System 2005 includes a video display 2010. Video display 2010 may receive video streams and electronic messages from an integrated tuner system such as the integrated tuner system 1012 of FIG. 6. Video display 2010 may display the video streams and electronic messages in a variety of formats. In a particular embodiment, video display 2010 may display information in a split screen format, including a video stream display 2012 and message display 2014. In another particular embodiment, video display 2010 may display electronic messages in ticker 2016. In another particular embodiment, video display 2010 may display electronic messages in a pop-up or drop down configuration. The particular display configuration may be selected by a user.

An integrated tuner system may include a voice conversion module 2018. Voice conversion module 2018 is operable to convert messages received by the integrated tuner system into an audio voice format. An integrated tuner system may transmit the messages in audio voice format to other devices including telephones. Voice conversion module 2018 may also receive audio inputs and convert those inputs to electronic commands or to electronic messages.

System 2005 may include a wireless keyboard 2020. Wireless keyboard 2020 may be used to compose messages, including electronic mail messages, IM messages or SMS, EMS, and MMS messages. These messages may be displayed by video display 2010 and transmitted by integrated tuner system 1012.

The methods and systems described herein provide for an adaptable implementation. Although certain embodiments have been described using specific examples, it will be apparent to those skilled in the art that the invention is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A system, comprising:
a processor;
a memory including instructions executable by the processor to perform operations including:
  determining that a first communication device is associated with a subscriber of a service;
  suspending a call from the first device to a second device;
  sending a call disposition query associated with the suspended call to a third communication device associated with the subscriber, wherein the call disposition query comprises an electronic mail message; and
  receiving a call disposition command from the third communication device associated with the subscriber, wherein the call disposition command indicates a call disposition for the suspended call.

2. The system of claim 1, wherein the third communication device is a telephone.

3. The system of claim 1, wherein the third communication device is a network-connected computing device.

4. The system of claim 1, wherein the first communication device is coupled to a wireless keyboard operable to compose electronic mail messages, instant messages, short message service messages, enhanced messaging serviced messages, multi-media messaging service messages, or any combination thereof.

5. The system of claim 1, wherein the third communication device is a set-top box.

6. The system of claim 1, wherein the call comprises an outgoing international call.

7. The system of claim 1, wherein the call comprises a toll service call.

8. The system of claim 1, wherein the processor further determines that the call comprises a call to an emergency services system.

9. A non-transitory computer-readable storage memory comprising operational instructions that, when executed by a processor, cause the processor to perform operations comprising:
  determining that a first communication device that originated a call is associated with a subscriber to a call activity information service;
  suspending the call at a network communication device;
  sending a call disposition query to an alternate communication device associated with the subscriber;
  when a call disposition command is received in response to the call disposition query within a particular period of time, enacting the call disposition command; and
  when the call disposition command is not received in response to the call disposition query within the particular period of time, sending the call to a destination communication device.

10. The non-transitory computer-readable storage memory of claim 9, wherein the processor determines whether the call is a particular type of call.

11. The non-transitory computer-readable storage memory of claim 10, wherein the particular type of call is at least one of an international call, a toll service call, and a call to an emergency services system.

12. The non-transitory computer-readable storage memory of claim 9, wherein the processor sends the call to an alternative destination.

* * * * *